Patented July 14, 1942

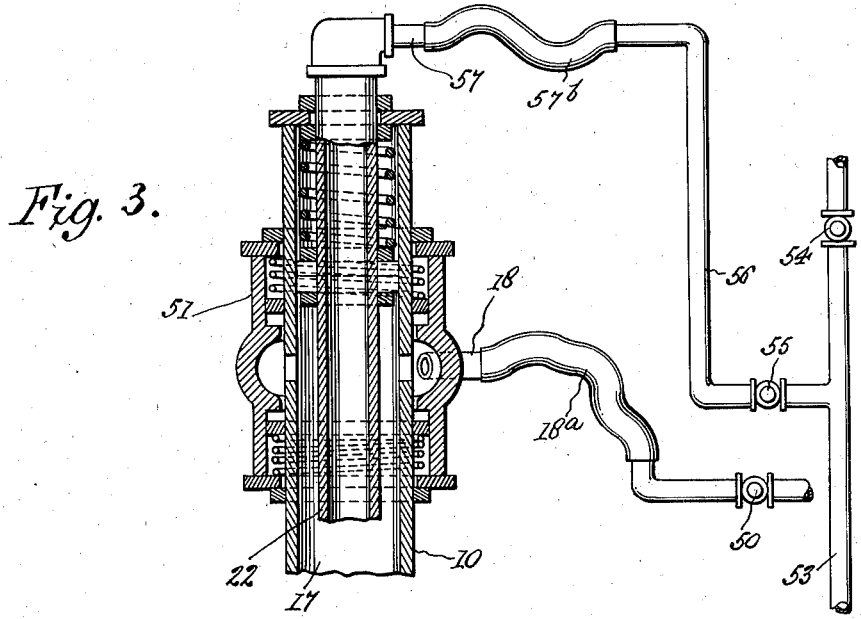
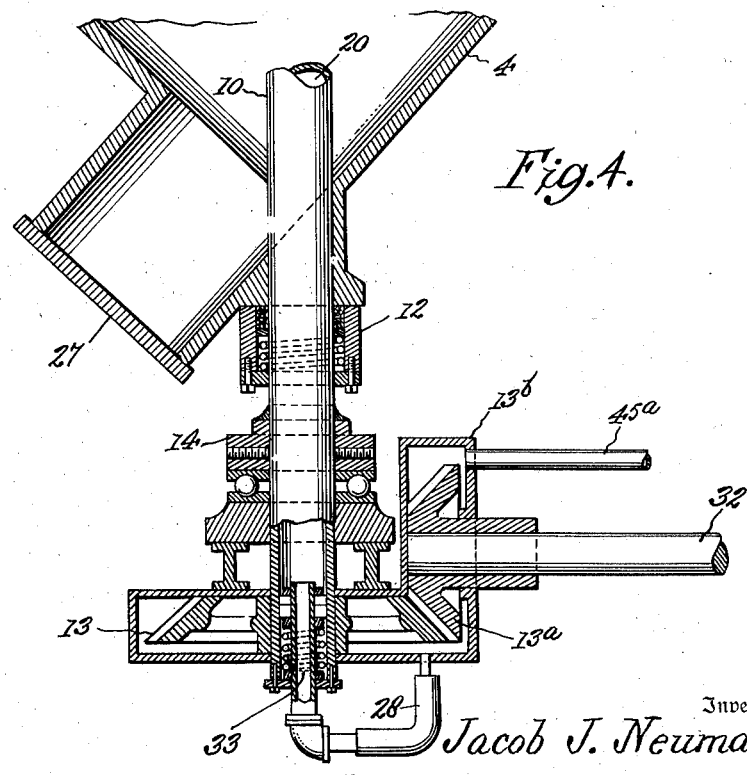

2,289,801

UNITED STATES PATENT OFFICE 2,289,801

VACUUM BOILING PAN

Jacob J. Neuman, South Salem, N. Y., assignor to United States Patent Development and Royalty Company, South Salem, N. Y.

Application April 11, 1939, Serial No. 267,355

9 Claims. (Cl. 159—25)

This invention relates to new and useful improvements in vacuum boiling pans and the like employed to increase the density of solutions or liquors or to recover the solute by evaporation of the solution or liquid.

One of the primary objects of the present invention is to increase the rate of boiling of the liquor in apparatus of this character by means of a movable heating element disposed in the vacuum boiling pan, which heating element serves not only to heat but simultaneously to agitate the material in the vacuum pans and thereby provide uniform heating of the material undergoing treatment.

Another object of the present invention is to employ an internal combustion engine or the like power means for driving the moving heating element in the vacuum pan and to transfer the heat from the driving means to the heating element by a heat transfer system whereby a high thermal efficiency is obtained.

Still another object is to provide a circulating system for a heating medium in fluid communication with a movable heating element disposed in a vacuum pan and to utilize the heat generated by the driving means for the movable heating element to heat the heating medium.

A further object of the invention is to provide a movable heating element in a vacuum pan to heat and simultaneously agitate the material undergoing treatment in combination with an internal combustion engine for driving the heating element and to transfer the heat from the engine to the heating element by means of a circulating system for a heating medium, said system including means for storing the heating medium during periods when it is not needed for processing in the vacuum pan.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of the improved vacuum pan, its installation and connections, all as constructed in accordance with the present invention, parts being broken away and parts being shown in section.

Figure 3 is a vertical section taken through the pipe head above the vacuum pan and showing the connections thereto partly broken away and partly in section, and Figure 4 is a vertical section of the lower portion of the vacuum pan showing the hollow shaft support and rotating mechanism.

Figure 1:
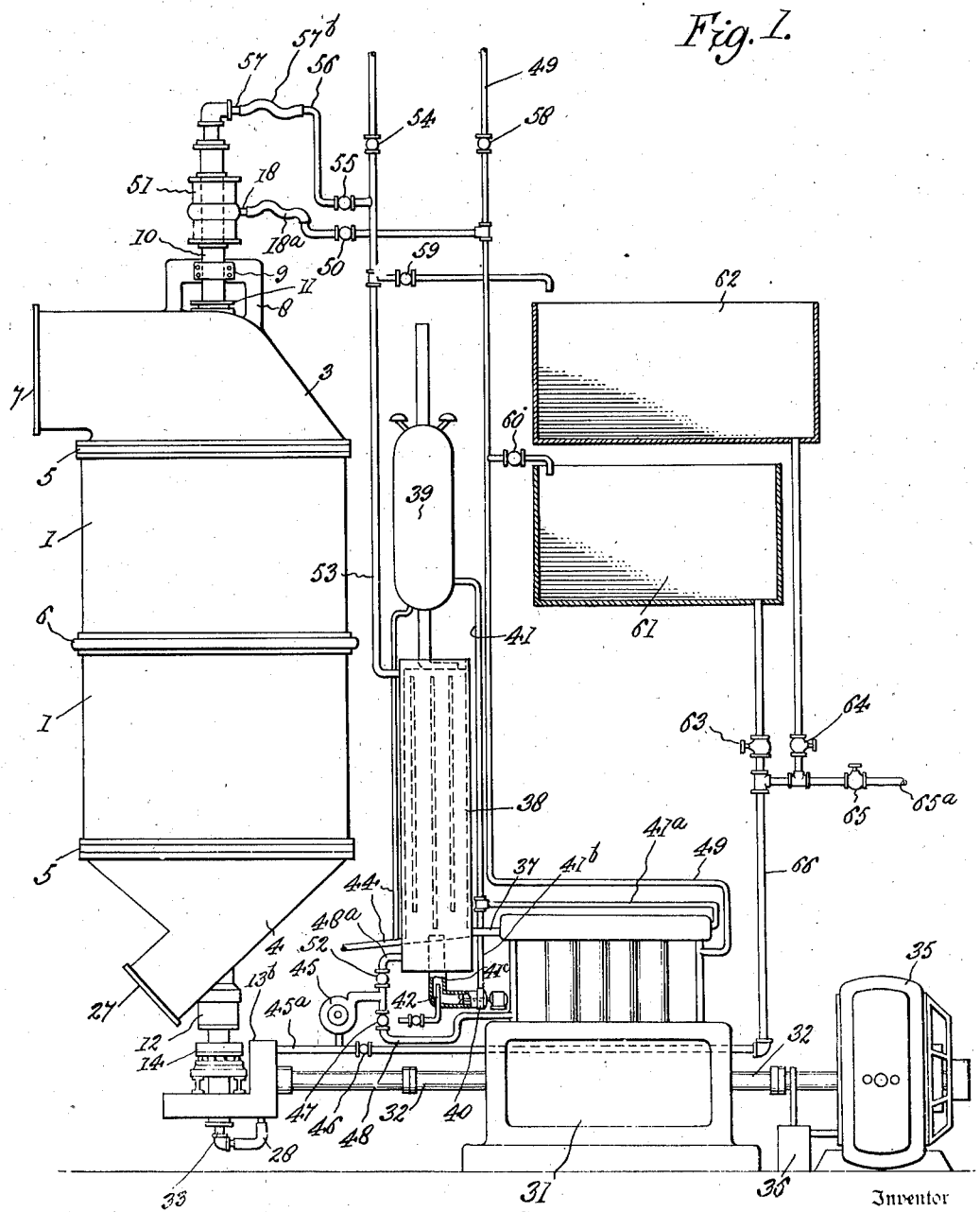
Figure 2:
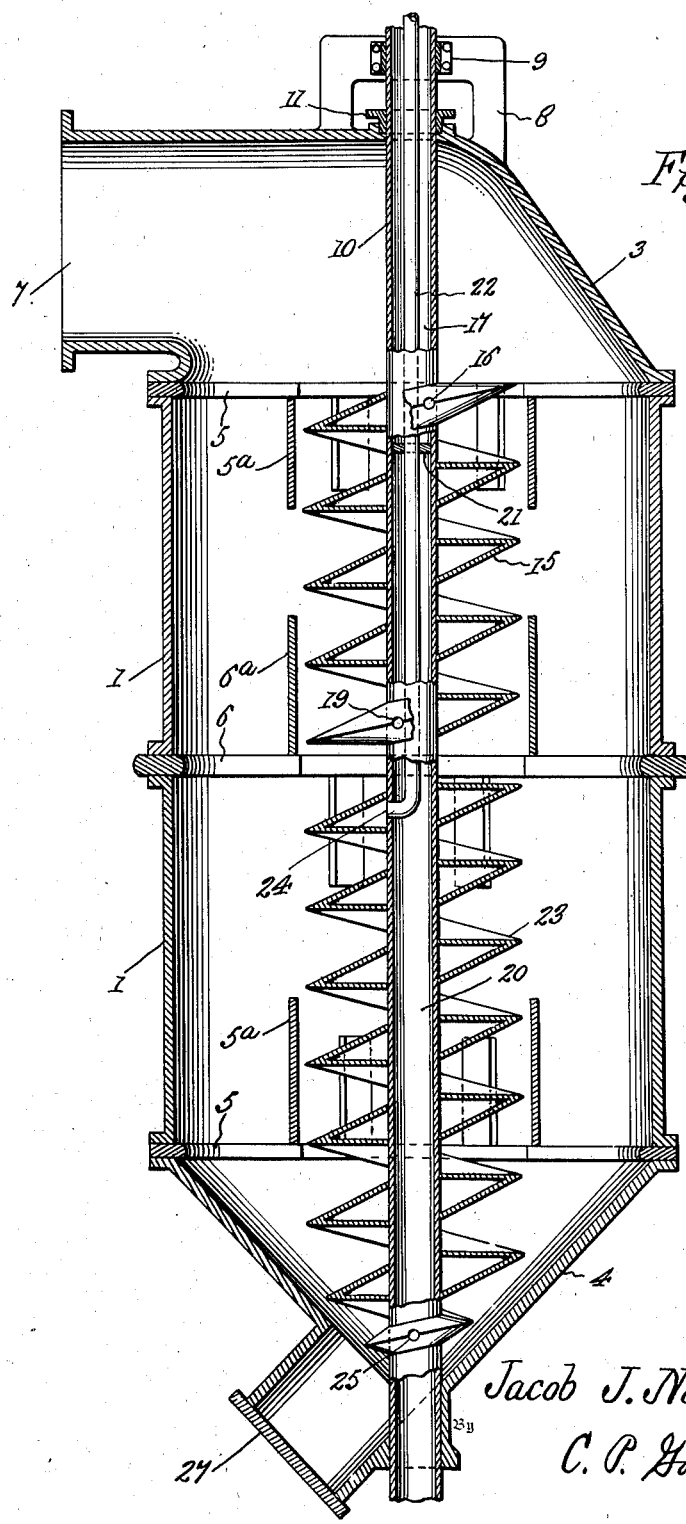
Figure 2 is an enlarged vertical central section taken through the vacuum pan and hollow rotatable heating element.

In the drawings, referring first to Figures 1 and 2, the improved vacuum pan is composed of a casing made up of two or more identical sections 1 secured together in any appropriate manner. Such column or casing is crowned by the cap 3. The lower end of the column is supported upon the base 4, which is preferably of inverted conical form, leading to an outlet through which the treated material may be dumped or evacuated. The sections 1 together with the cap 3 and base 4 form the complete shell of the pan. Separators 5 are shown within the pan near the upper and lower ends of the pan for supporting baffle plates 5a. A separator 6 and baffle plate 6a are shown centrally within the pan. Obviously more separators and baffle plates might be used in the case of a pan employing more than two sections 1; or the baffle plates might be omitted for pans of certain types; or the baffle plates might be rearranged as desired.

Due to the large diameter of shaft used no center bearing within the pan is necessary. The shaft may be made as large as desirable as the added heated surface thereon will justify use of more material and facilitate the attachment of the flights to the shaft.

The upper cap 3 is designed for pipe connection to the vacuum creating condenser pipe line 7. It also has incorporated in it vertical members 8 to support the upper bearing 9 of the shaft 10. The shaft 10 is hollow and constitutes a moving or rotating heater element. A gland packing 11 is provided to assure a tight joint where the shaft 10 passes through the upper portion of the pan cap 3. The new type gland with spring-retained packing, as hereinafter described, may be used at this point if necessary instead of the conventional gland packing.

The base 4 is provided with a gate 27 suitable for emptying and draining out the pan after processing of the substance is finished. Pans used for producing end products in readily-flowable liquid condition, such as evaporated milk or products of similar consistency, would be equipped with pipe connections as well as a gate. The base 4 is also provided with a gland fitting or packing 12 which provides a tight fit for the shaft where entering the pan.

The bevel drive 13, 13a, shown in Figures 1 and 4, is connected to drive the hollow shaft 10 and is attached near the lower end of the shaft. The shaft 10 is provided with a step thrust bearing 14 of suitable type to support the shaft 10 vertically and to hold the bevel gear 13 in positive alignment with the drive pinion 13a preventing lateral displacement.

As shown more particularly in Figure 2, the heater element of the pan is in the form of a substantially V-shaped hollow helix or screw attached by suitable means to the shaft 10. This helix or screw, while apparently continuous from an external viewpoint, is divided into a number of sections to which the fluid heating medium is separately supplied.

In Figure 2 two such sections are shown. The upper sectionalized flight 15 of the heater element receives its heating medium through an opening 16 in the shaft 10. The hollow shaft 10 itself provides a passage for the fluid downwardly to and through opening 16 and into the upper end of the hollow flight section 15.

As shown in Figure 3, the hollow space or passage 17 within shaft 10 receives the heating fluid from a pipe 18 connected at the upper end of the passage 17.

Reverting to Figure 2, an opening 19 in the shaft near the lower end of the top flight section 15 provides a path for the heating medium to re-enter the hollow shaft 10 after circulating through the section 15. This lower section of the shaft has an internal uninterrupted space 20 with which the opening 19 directly communicates, such passage 20 being for the purpose of carrying off the heating medium and its condensate after passing through the hollow flight sections. The passages 17 and 20 are both within the hollow shaft 10 and they are separated by a plug 21 which is set just below opening 16 thereby preventing the passage of the heating medium received in the upper shaft passage 17 from flowing directly down into the lower passage 20 of the pipe section and being evacuated by that passage 20. The plug 21 also acts as a heat insulated support for the inner pipe 22. This inner pipe is of smaller diameter than the internal diameter of the shaft 10 thus forming with the shaft 10 the annular passage 17. The inner pipe 22 provides a means of introducing fluids to the bottom sectionalized flight 23.

As shown in Figure 3, the inner pipe 22 receives its fluid supply from an inlet connection 57 at the top thereof. Reverting to Figure 2, the lower end of pipe 22 is turned as indicated at 24 and passed through the pipe 10 to cause communication with the first convolution of the lower hollow helix 23 whereby to cause the fluid or heating medium to circulate downwardly through the bottom helix down toward a discharge opening 25 in the shaft 10 which allows the fluid or its condensate to pass out from the bottom helix 23 into the lower passage 20 of hollow shaft 10, thereby to be evacuated.

It will be noted that the openings 19 and 25, both being discharge openings, each communicate with the passage 20 in the lower part of shaft 10. This passage or common chamber 20 within the hollow shaft constitutes an unimpeded path to the outlet fitting 33 at the lower end of the hollow shaft as shown in Figures 1 and 4.

Referring more particularly to Figure 1, in which the vacuum pan is shown as coupled in an operating system, 31 represents a multiple cylinder internal combustion engine, the drive shaft of which is represented at 32. As shown in Figure 4 this drive shaft drives the bevel gear 13a, which through bevel pinion 13 drives shaft 10 of the rotating heater element.

The engine shaft 32, at the opposite end of the internal combustion engine, drives a generator 35 for providing power at a constant voltage suitable for use on equipment within reasonable distances of power transmission and distribution. The generator is equipped with suitable automatic voltage control 36 which regulates the field current of said generator 35 in suitable relationship with the speed of the internal combustion engine to give constant voltage within the reasonable operating range of speeds of said engine 31.

The exhaust gases from the internal combustion engine 31 are discharged therefrom through outlet or exhaust pipe 37 into the muffler and oxidizing chamber 38. In the muffler the exhaust gases are mixed with an excess of air and a supply of volatile oil vapor, thereby insuring complete combustion of all incompletely burned gases. From the muffler and oxidizing chamber 38 the completely burned gases are led through the air cooler 39, where, by means of counterflow arrangement of tubes carrying fresh and exhaust air, the latter gives up practically all of its heat to the former, providing heated fresh air for the internal combustion engine air intake and the blower by means of the warm air pipe 41, 41a. The blower 40 also receives warm air through the pipes 41 and 41b and blows this warm air into the muffler 38 through the pipe connection 41c. An oil jet 42 projects into pipe 41c, or in other words into the air line from the blower 40 to the chamber 38. The jet 42 is in communication with a suitable source of oil supply. The air passing jet 42 picks up the oil and volatilizes the same in sufficient quantities to insure that the burning thereof within the muffler 38 shall be continuous.

Both muffler 38 and air cooler 39 are equipped with drainage pipes 44 which permit any condensate formed to be led away to a suitable water pipe or drainage system. The fluid which circulates in the hollow flight sections of the vacuum pan and which is evacuated through the bottom chamber 20 of the hollow shaft 10 is received in the outlet fitting 33, as shown more particularly in Figure 4, and circulated by means of the pipe connection 28 to the casing which houses the bevel gears 13 and 13a. This fluid or circulating medium leaves the bevel gear reduction drive unit 13, 13a after absorbing heat while passing through its water jacket is pumped into the high pressure line by the pump 45, a pipe 45a connecting the inlet of pump 45 with the outlet side of the bevel gear casing 13b. Storage tanks are indicated at 61 and 62, such storage tanks containing make-up fluid or circulating medium. The bottoms of the two reserved tanks 61 and 62 are connected with the inlet of pump 45 by means of a pipe line 66. Valves 63 and 64 control the outlet of fluid respectively from tanks 61 and 62. The pipe 65a is connected with a source of additional make-up medium supply and a valve 65 controls the inlet of such additional or new make-up material. Pump 45 pumps fluid from the gear casing 13b together with any needed make-up medium or additional quantity necessary from the reserve storage tanks 61, 62 depending on the adjustment of valve 46 interposed in the pipe line 66. The relative amounts of reserve and new make-up medium introduced are determined by the setting of make-up medium valve 65 and reserve supply valves 63 and 64 for the tanks 61 and 62 respectively.

This fluid or circulating medium may be water, mercury or any other suitable volatile liquid or evaporated gas thereof which could be used to transfer heat from one heat exchange apparatus to another to permit the high thermal efficiencies necessary to the economical operation of the set-up.

On the outlet side of pump 45 are pipe connections 48 and 48ª having valves 47 and 52 therein. Part of the medium from pump 45, according to the adjustment of valve 47, circulates through the cooling jacket around the cylinders of the internal combustion engine 31, thereby gaining considerable heat while at the same time cooling the engine to a safe operating temperature. After circulating through the cooling jacket of the engine this fluid passes out into pipe 49 and on through valve 50 to pipe 18 which leads into the upper end of shaft 10 by means of fitting 51. The circulation of this fluid or circulating medium through the worm or screw of the vacuum pan has already been described.

The circulating medium from the engine cooling jacket may also be partly led away upwardly through bleeder valve 58 for other uses or through valve 60 into tank 61 for reservation until again needed.

The pump 45 also circulates medium from the cooling casing 13ᵇ of the speed reduction drive unit 13, 13ª, together with the needed make-up medium, according to the adjustment of valve 52 to and through the cooling jacket of the muffler or oxidizing chamber 38 and on out through the line 53. A part of this circulating medium may be led out of the system according to the adjustment of the bleeder valve 54, or passed by valve 59 into reserve tank 62. The remaining medium will pass through valve 55 into the pipe line 56. This line is connected to the interior chamber or pipe 22 of the hollow shaft through the end connection 57, as shown to best advantage in Figure 4. The flow of the medium from this point downwardly through the lower flight section has already been described. This medium after being evacuated from the lower flight section is again circulated to the gear reduction casing 13ᵇ.

It is apparent that there may be alternate methods of circulating the medium according to the relative temperature rises and heat available but the principle of using all thermal energy from the exhaust gases and speed reduction gears will hold by any arrangement of piping. Also, the system, to insure complete combustion of exhaust gas from the engine, will not be changed in principle by arranging the air intake ahead of the combustion and oxidizing chamber.

In operation the substance to be processed is brought in at the top of the vacuum pan 1 and after being treated is discharged through the base 4 of the pan either in a continuous operation or at intermittent periods. This substance is subjected in the pan to the heat treatment of the continuously rotated worm or screw, this worm itself progressing spirally through the fluid substance being treated and thus causing all external areas upon the flights to come in contact with large volumes of the substance being treated; and at the same time causing movement in the substance being treated so as to bring all parts of that fluid or liquid substance into physical contact with the external heating surfaces of the worm or flights.

The worm is driven by the internal combustion engine 31 which also drives generator 35 and which provides the means for storing up heat in the heating medium which is used in the vacuum pan.

The water jacket of the internal combustion engine furnishes hot water or steam through pipe 49 to connection 18 and to the chamber 17 of the hollow shaft 10.

After this hot water, steam or other heating medium circulates through the upper hollow flight section 15 it is returned through the passage 20 in the hollow shaft 10 down to the gear casing 13ᵇ. In the gear casing the heat spent in the hollow flight section begins to build up again. This reheated medium from casing 13ᵇ is circulated by pump 45 through pipe connection 48 back to the water jacket of the engine, although part of it may be diverted through pipe 48ª to the water jacket of the muffler 38. The hot water, steam or other heated medium from the jacket of the muffler 38 is circulated by pipe 53 to the connection 57 and thence by pipe 22 to and through the bottom hollow flight section 23 of the vacuum pan, eventually escaping therefrom into passage 20 of the hollow shaft 10 and thence to the gear casing 13ᵇ, in which the spent heating medium undergoes an initial reheating, the same being finally heated either in the engine water jacket or in the muffler jacket.

The heating medium not needed is stored in the reservoirs or tanks 61 and 62 from which it is withdrawn as occasion arises through pipe 66 and circulated back into the system by the pump 45.

Fresh air is heated in the cooler 39 by the products of combustion passing through the same from the muffler 38, and this heated fresh air is delivered by pipes 41 and 41ª to the intake of the internal combustion engine and also by pipes 41 and 41ᵇ to the inlet air pipe 41ᶜ of the muffler into which oil vapor is introduced by the jet or nozzle 42 for the purpose of effectually burning all the products of combustion.

By means of the valves 50 and 55 the heating medium may be turned only into the bottom coil 23 initially if that is desired, and later as the mass in the vacuum pan envelops the upper flight section 15, the valve 55 may be opened to allow that upper section 15 to become heated. Also the flight sections may be heated at different temperatures. Thus in the beginning of the operation, the upper half of the vacuum pan is ordinarily empty so that the top flight would be left unheated to exclude the possibility of small masses of liquor and the solids therefrom sticking to the otherwise hot surface and becoming scorched, discolored or decomposed. In the case of evaporating milk or liquors of low density, the use of all heater flights would be desirable from the outset. As the evaporation progressed and the substance in the pan retired downwardly below the upper flight sections the heat might be turned off from those sections to avoid accidental decomposition of the substance incident to boiling fluid being splashed against the hot surfaces of upper exposed flight sections. Thus the sectionalized flight arrangement with the individual control for separately heating the sections provides a flexible vacuum pan operating upon a new method of operation and in which heat may be delivered to any part of the pan and any portion of the substance therein for the purpose of individually treating that substance in the manner as best suits the needs of the nature of that substance to the end that processing of the substance may be carried out in a minimum space of time without subjecting the substance to deterioration, decomposition, burning, discoloration or any other defects to which existing apparatus and methods subject the material.

In Figures 1 and 3 the pipe nipples 18 and 57 are shown as coupled to flexible pipe sections 18ª and 57ᵇ to allow for variations in fitting connections and to permit alignment of the parts and also to permit free play of the packing.

It is obvious that various changes and modifications may be made in the details of construction and design of the above specifically described embodiment of this invention without departing from the spirit thereof, such changes and modifications being restricted only by the scope of the following claims.

What is claimed is:

1. An apparatus of the kind described comprising an internal combustion engine, a vacuum pan, a movable heater element in said vacuum pan, driving gear connections between said engine and heating element, a casing about said driving gear connections for receiving fluid, an exhaust muffler for the internal combustion engine having a jacket in communication with said casing and with a source of reserve supply of heating medium, a pump between said casing and jacket, and means for circulating the heating medium from said jacket to the heater element in the pan.

2. In apparatus of the kind described, an internal combustion engine, an exhaust muffler therefor having a jacket, an air cooler for receiving the products of combustion from said muffler and having a counterflow fresh air passage therethrough in communication with the air intake of the engine and with the exhaust gas space of said muffler, a water jacket for the engine, a vacuum pan, a movable heater element in said vacuum pan, gear connections from said engine for driving said movable heater element, a casing for said drive connections having a space for heating medium, connections between said casing and the jacket of the muffler, connections also between the water jacket and the jacket of said muffler, connections for conveying off from the jacket of the muffler the heating medium to said heater element, means for storing excess quantities of said heating medium and for connecting the excess supply in a closed cycle with the jacket of said muffler, means for also supplying from the water jacket of the engine heating medium to said movable heater element of the pan, a reserve supply coupled to said last means and in a closed cycle with the water jacket of the engine and having connection to the jacket of the muffler, and means for evacuating the spent heating medium from the heater element of the pan into said casing.

3. Apparatus of the class described comprising in combination, a vacuum pan, a rotatable hollow screw element in said vacuum pan, a circulating system for a fluid medium to heat said screw element, and an internal combustion engine for rotating said hollow screw element and for heating the fluid medium in said circulating system.

4. Apparatus of the class described comprising in combination, a vacuum pan, a hollow rotatable screw element in said vacuum pan, a circulating system for a fluid medium to heat said screw element, an internal combustion engine for heating the fluid medium in said circulating system and for rotating said screw element, and means in said system for storing the heating medium for periods when it is not needed for processing purposes in said vacuum pan.

5. Apparatus of the class described comprising in combination, a vacuum pan, a rotatable hollow screw element vertically mounted in said pan, a circulating system for a fluid medium having inlet connection to the upper portion of said hollow screw element and outlet connection from the bottom of said hollow screw element, and an internal combustion engine for heating the fluid medium in said circulating system and for rotating said screw element.

6. Apparatus of the class described comprising in combination, a vacuum pan, a rotatable hollow screw element in said pan divided longitudinally into a plurality of separate hollow flight sections, a circulating system for a fluid medium in communication with said separate sections, and an internal combustion engine for heating the fluid medium in said system and for rotating said screw element.

7. Apparatus of the class described comprising in combination, a vacuum pan, a hollow shaft rotatably mounted in said vacuum pan and having a plurality of hollow helical sections to form a screw element, each of said helical sections having a fluid inlet connection adjacent one end thereof and a fluid outlet connection adjacent the opposite end, the fluid outlet connection of each of said sections communicating with the interior of said hollow shaft, a fluid outlet connection at one end of said hollow shaft, a circuit for a fluid medium in communication with the inlet connections to said helical sections and with the outlet connection from said hollow shaft, an internal combustion engine for heating the fluid medium in said circuit, and means operatively connecting said engine with said hollow shaft to rotate the latter.

8. Apparatus of the class described comprising in combination, a vacuum pan for concentrating the crystallizable liquids, a hollow rotatable screw element in said pan, an internal combustion engine, a cooling jacket for said engine, a circuit for a fluid medium in communication with said jacket and with said hollow rotatable screw element, means for circulating the fluid medium through said circuit whereby the heat taken up by said fluid medium in flowing through said cooling jacket is transferred to said screw element to heat the material being processed in said vacuum pan, and means operatively connecting said engine to said screw element to rotate the latter.

9. Apparatus of the class described comprising in combination, a vacuum pan, a rotatable hollow screw element in said vacuum pan, a circulating system for a fluid medium to heat said screw element, an internal combustion engine for rotating said hollow screw element, means for heating the fluid medium in said circulating system, and auxiliary means for supplying additional heat energy to the fluid medium in said circulating system.

JACOB J. NEUMAN.